Jan. 29, 1963

A. RAPPOLD ET AL 3,076,154

AUTOMATIC FREQUENCY CONTROL ARRANGEMENT

Filed Sept. 23, 1959

INVENTORS
A. RAPPOLD
H. HEIN
BY C. H. Suydam
AGENT

United States Patent Office 3,076,154
Patented Jan. 29, 1963

3,076,154

AN AUTOMATIC FREQUENCY CONTROL ARRANGEMENT

Armin Rappold, Neuenburg, Wurttemberg, and Hans Hein, Pforzheim, Germany, assignors to Standard Elektrik Lorenz Aktiengesellschaft, Stuttgart-Zuffenhausen, Germany, a corporation of Germany Filed Sept. 23, 1959, Ser. No. 841,748
Claims priority, application Germany Sept. 27, 1958
3 Claims. (Cl. 331—177)

Figure 1:
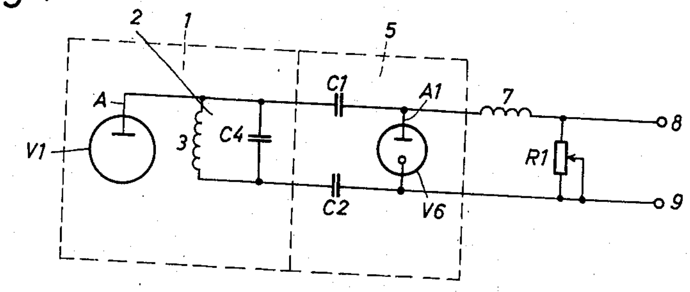

The present invention relates to automatically controlled, remotely controlled or D.C. controlled frequency control circuits operating on the principle of the angular current flow control with the aid of diodes, preferably for the metric and decimetric wave band of television receivers.

With respect to receivers which are operated within the range of the decimetric wavelengths there are substantially two reasons for the necessity of an automatic tuning. First of all it is supposed by this arrangement to compensate the migration of the oscillator frequency as caused by heating or voltage variations. On the other hand the adjusting or setting accuracy is reliably safeguarded especially in the case of a continuous tuning. The last mentioned argument is particularly applicable to television receivers which are operated in the frequency band above 470 mc./s.

It has already become known to this end to represent variable reactances by way of tubes which are operated in a feedback arrangement, and in which, with the aid of suitable networks, e.g. the voltage between the anode and the cathode, with respect to the voltage between the grid and the cathode, is shifted in phase by 90°, so that thereby the tube will become effective as an effective reactance, the magnitude of which can be affected by changing the operating voltages.

Furthermore it is known that as a variable reactance, a controllable capacitance can be obtained in such a way that there is used a fixed capacitor which is only temporarily inserted, or is partially inserted within one period, in which case a rectifier or a diode, or a directional conductor is used as the switching element, so that in a simple way the current flow angle and, consequently, the respectively necessary effective capacitance can be controlled.

Finally it is also known to use such a method of the angular current flow control for the frequency control purpose, or for the sharp tuning of television receivers respectively, if necessary in connection with a remote control.

With respect to such arrangements technically realizable solutions have to be carried out for the automatic tuning up to frequencies of 250 mc./s., that is, in a range in which oscillating circuits can still be composed of concentrated circuit elements.

However, the aforementioned principle, within the decimetric wave range, and in the case of a continuous tuning of a larger frequency range, is entailed by difficulties, because the particular shape of embodiment of the oscillating circuits within this range requires the reactance circuit to be arranged as parallel as possible in relation to the tube capacitance, in order to obtain a coupling within the potential loop or within the current node respectively.

The lead-in conductors can be practically only led to the tube socket, and with respect to this frequency range the shape of the potential loop is still insufficient.

This disadvantage is eliminated by the invention in that there is provided an arrangement in which the reactances are arranged in an ideal manner directly in parallel with the tube cpacitances. The invention is characterized by the fact that the diode which is necessary for the arrangement and which is capacitively coupled to the oscillator is coupled to the system serving the generation of the oscillations and, together with this system, in the form of a diode system which is capacitively coupled to this system, is built into the oscillator tube.

In further prosecuting the idea of the invention there is put out of the tube, besides the connections for the oscillator system as led out of the tube, only one further connection for the reactance system.

In further embodying the idea of the invention the reactance circuit, consisting of a diode gap, if necessary with a cathode of its own, and (a maximum of) two fixed capacitances, is built into the same glass envelope in a directly combined manner with the tube system.

Figure 2:
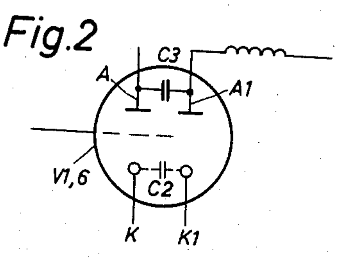
Figure 3:
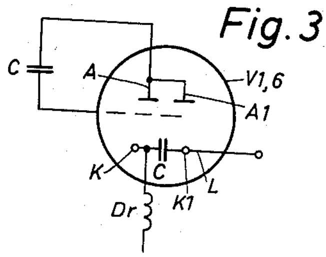
Figure 4:
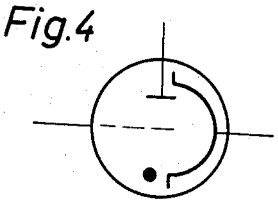
Figure 5:
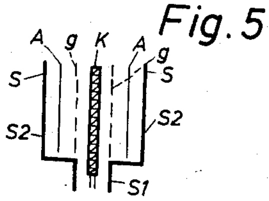

In the following the invention will now be described in particular with reference to some exemplified embodiments shown in FIGS. 1–5 of the accompanying drawings, in which:

FIG. 1 schematically shows the principle of a circuit arrangement of the type known per se and serving to effect the sharp tuning with the aid of the angular current flow control method, FIGS. 2 and 3 show some exemplified embodiments of the invention, and, FIGS. 4 and 5 show some details relating to the invention.

According to the showing of FIG. 1 the oscillator 1 consists of the tube $V_1$ (in which there is only shown the anode which is necessary for enabling the better understanding of the invention, in the circuit arrangement according to FIG. 1 which is e.g. known per se), as well as of the oscillating circuit 2, the inductance 3 and of the capacitance $C_4$, and which may be operated e.g. in a three-point connection (potentiometer circuit scheme). The reactance circuit 5 consists of the two fixed capacitors, $C_1$, and $C_2$ which, with the aid of the diode V6, the anode of which is denoted by $A_1$, can be connected in parallel to the capacitor $C_4$ of the oscillating circuit 2. Via the reactor 7 and a potentiometer $R_1$ the charge of the capacitor arrangement $$C=\frac{C_1 \cdot C_2}{C_1+C_2}$$

can be derived, and the time-constant $R_1C$ can be varied. With the aid of a remote-control potentiometer capable of being connected at the points 8 and 9, it is furthermore possible to effect a remotely controlled fine-tuning.

The mode of operation of such an arrangement will be easily understood when considering that in dependency upon the current flowing through the diode V6, due to the series connection of $C_1$ and $C_2$, also the current will flow through these capacitances and, consequently, in accordance with the current flux, more or less capacitance will be connected in parallel with the capacitor $C_4$. In the one critical case the diode V6 is blocked with the aid of the biasing potential so that $C_1$ and $C_2$, with respect to $C_4$, are practically disconnected, while in the other critical case—in the full conductivity of the diode V6—they are connected in parallel with the complete value, to the capacitance $C_4$. If, for example, the oscillator frequency deviates in direction towards too high frequencies, and if on account of this e.g. by the video-detector, there is delivered a higher amplitude (corresponding to the position of the intermediate frequency in relation to the characteristic of the IF-filter) than would correspond to the exact tuning, and subsequently to the rectification, and perhaps by an amplification, would be fed to the diode V6 then this diode would correspondingly become conductive (unblocked) and the reactance circuit, by way of a corresponding insertion of the capacitance (by way of angular current flow control) would become effective, and would perform the fine tuning or the automatic frequency control (automatic tuning control) respectively.

For reasons as already mentioned hereinbefore, this circuit arrangement is merely realizable for an automatic tuning in the case of frequencies up to 250 mc./s., or up to the television band I–III respectively. In the case of higher frequencies, however, this arrangement has proved satisfactory.

According to the invention the reactance arrangement, that is, the part 5 as shown in FIG. 1, is built into the oscillator tube as well. For control purposes it is known per se to build triode systems and diode systems into the envelope of a tube, but unlike to these conventional arrangements the present invention proposes to include the reactance arrangement, that is, the diode system including the capacitances of a very specific dimensioning, which is suitable for the frequency-control purpose or the angular current flow control respectively, as a separate system in the tube.

According to the example of embodiment as shown in FIG. 2 the tube $V_{1,6}$ is designed in such a way that the arrangement, symbolically shown as the left hand system, represents the oscillator triode with the led-out anode A, while $A_1$ represents the led-out anode of the reactance diode, both of which are connected inside the tube by way of the control or series capacitance $C_3$ (corresponding to the capacitance $C_1$ or $C_2$ respectively of FIG. 1), "K" may represent a common cathode or, in the case of separated cathodes, may be the cathode as belonging to the triode system, while in the latter case $K_1$ represents the cathode belonging to the diode system. $C_2$ may still be a capacitance which, if so required, may be connected between the two cathodes K and $K_1$.

In FIG. 3 there is shown an example of embodiment according to which there is likewise provided a common anode connection, while the capacitance C and one inductance L (the latter likewise included in the tube envelope) are arranged between the cathodes and are provided with a led-out connection. Of course, in analogous manner, instead of this also the two cathodes may be connected correspondingly.

In FIG. 4, finally, as a special type of embodiment for the built-in capacitances with respect to anode, or cathode or grid respectively, there is arranged a special sheetmetal plate inside the tube.

FIG. 5 shows a constructional solution relating to the arrangement according to FIGS. 2–4. Reference K indicates a cathode which is concentrically surrounded by the grid G and the anode A. The sheetmetal plate S concentrtically surrounds the cathode at the point $S_1$ and, consequently, represents the anode of the diode. This sheetmetal plate is enlarged towards above and encloses the anode by the portion having the diameter $S_2$, so that it simultaneously constitutes the necessary capacitance against the anode of the oscillator tube.

Although the invention is of a particular advantage for employment with the metric and decimetric wave band, it is naturally also applicable to lower frequency ranges, that is, also from 40 mc./s. on. Furthermore, the possibilities of practical application of the invention not only relate to the field of television receivers, but of course, the invention is also applicable to other control circuits, e.g. as used in blind broadcasting or commercial receivers.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An automatic frequency control device comprising a triode and a diode in an envelope, a capacitor also disposed within said envelope and connected directly between two corresponding electrodes of said triode and diode, an external resonant circuit coupled to said triode, and means coupled to said diode for varying the current therethrough to control the flow of current through said capacitor to vary the operating frequency of said triode.

2. In an automatic or remote frequency control circuit having an oscillator circuit, including a triode, whose parameters are to be varied: the combination within a single envelope of said triode, a diode, and a capacitor coupling two corresponding elements of said triode and diode, the other two corresponding elements being electrically one, said control circuit further having means connected to said diode for varying the voltage thereon, whereby the flow of current through said capacitor and hence the operating frequency of said oscillator circuit is varied.

3. The combination as claimed in claim 2 wherein said triode, diode, and capacitor consist of an elongated cathode, a grid disposed coaxially about said cathode for a portion thereof, an anode disposed coaxially about and substantially coextensive with said grid, and a sheetmetal plate having major and minor diameter portions, the said major portion being disposed coaxially about and substantially coextensive with said anode, and said minor portion being disposed about the remaining portion of said cathode.

References Cited in the file of this patent

UNITED STATES PATENTS

| | | |
|---|---|---|
| 1,995,175 | Gill | Mar. 19, 1935 |
| 2,568,395 | Herold | Sept. 18, 1951 |
| 2,763,779 | De Groot et al. | Sept. 18, 1956 |